United States Patent [19]
Hulbert

[11] Patent Number: 5,418,814
[45] Date of Patent: May 23, 1995

[54] THRESHOLD CANCELLATION MEANS FOR USE IN DIGITAL MOBILE RADIO NETWORKS

[75] Inventor: Anthony P. Hulbert, Shirley, England

[73] Assignee: Roke Manor Research Limited, Romsey, England

[21] Appl. No.: 257,094

[22] Filed: Jun. 7, 1994

[30] Foreign Application Priority Data

Jul. 1, 1993 [GB] United Kingdom ............... 9313609

[51] Int. Cl.⁶ ................. H04L 27/30; H04B 1/10
[52] U.S. Cl. ................. 375/205; 380/34; 370/18; 455/50.1; 455/51.1; 455/63; 455/296; 455/297; 375/206; 375/346; 375/349
[58] Field of Search ............ 375/1; 380/34; 370/18; 455/50.1, 51.1, 63, 67.3, 296, 297

[56] References Cited

U.S. PATENT DOCUMENTS

| | | | |
|---|---|---|---|
| 4,470,138 | 9/1984 | Gutleber | 370/18 |
| 5,099,493 | 3/1992 | Zeger et al. | 375/1 |
| 5,105,435 | 4/1992 | Stilwell | 375/1 |
| 5,224,122 | 6/1993 | Bruckert | 375/1 |
| 5,235,612 | 8/1993 | Stilwell et al. | 375/1 |
| 5,325,394 | 6/1994 | Bruckert | 375/1 |

Primary Examiner—Bernarr E. Gregory
Attorney, Agent, or Firm—Hill, Steadman & Simpson

[57] ABSTRACT

In a direct sequence spread spectrum code division multiple access receiver using interference cancellation, the signal for cancellation is derived by demodulating the unwanted signals and re-modulating a carrier to create a near replica for subtraction from a delayed version of the total received signal. Errors in the demodulation process degrade the cancellation. The present invention provides an optimal way of using the reliability information in the demodulator decision variable either to turn the cancellor off for unreliable bit decisions or to partially disable the cancellor according to the bit reliabilities.

4 Claims, 1 Drawing Sheet

THRESHOLD CANCELLATION MEANS FOR USE IN DIGITAL MOBILE RADIO NETWORKS

BACKGROUND OF THE INVENTION

1. Field of the Invention

The present invention relates to threshold cancellation means for use in digital mobile radio networks of the type wherein a number of base stations communicate with a number of mobile radio units each being temporarily affiliated to a particular base station.

The present invention relates more specifically to interference cancellation in a direct sequence spread spectrum (DSSS) code division multiple access (CDMA) scheme. Any unwanted signals are demodulated and the recovered data along with the channel information is derived from a pilot signal and is used to create a near replica of the unwanted signal for cancellation.

2. Description of the Related Art

Cancellation can be very effective if the code phase, carrier phase and amplitude of the significant multipath components of the interfering signal are known, provided correct decisions are taken on the data modulating the unwanted signal. Whenever an incorrect decision is taken, tar from canceling the interference the circuit will increase it. For example, if the interference RMS voltage is A volts, then the optimum cancellation would be an equal and opposite, reconstructed signal, also of A volts. However, when an error is made, the output of the cancellation means will not be zero but 2A volts, i.e. providing four times the power which would have been received if cancellation had not been applied. In this situation it would have been better not to have attempted to cancel the interference.

SUMMARY OF THE INVENTION

Accordingly, it is an object of the present invention to provide cancellation means which can be turned off whenever incorrect decisions become likely.

A further object of the present invention is to provide cancellation means which may be partially turned off whenever incorrect decisions become likely.

An embodiment of the present invention provides cancellation means including means for receiving and modifying an output signal indicative of an absolute value from a Rake combiner, means for receiving and scaling a pilot signal, first multiplying means for generating a signal that is a product of the scaled pilot signal and a modified output signal, an average and hold device for receiving the output signal generated by the first multiplying means, second multiplying means for combining a signal generated from the average and hold device with a delayed output signal, from the Rake combiner generator means for receiving said output signal from said second multiplying means and generating a signal indicative of a non-linearity function, third multiplying means for combining the output signal from the average and hold device and the signal indicative of a non-linearity function to product an output signal and interference spreading means for receiving the output signal from the third multiplying means, the output signal from the third multiplying means thereby controlling the interference spreading means.

Features of the present invention will become apparent from the following detailed description with reference to the accompanying drawings.

DETAILED DESCRIPTION OF THE PREFERRED EMBODIMENTS

The present invention provides a threshold cancellation means for use in digital mobile radio networks. A detailed description thereof using exemplary values follows.

Consider a known short term signal rms voltage, A, with modulation for the kth symbol, $m_k$ which is either $+1$ (for a transmitted "1") or $-1$ (for a transmitted "0"). The signal is received in the presence of noise with variance, $\sigma$. The demodulator makes decisions $d_k$ which match $m_k$ when correct. Thus, the signal energy component at the output of the canceler (when active) for the kth symbol is given by:

$$C_{out}(\text{active})_k = A^2(m_k - d_k)^2$$

The probability distribution of the received voltage, R, is given by:

$$P(R) = \frac{1}{\sigma\sqrt{2\pi}} \exp\left\{ -\frac{(R - m_k\sqrt{2}\,A)^2}{2\sigma^2} \right\}$$

For a given particular value r of R, it is desirable to know whether it is better to cancel or not. The problem is that it is not known whether a 1 or 0 was transmitted. The reliability of the decision will depend on the modulus of r. Therefore, $$P(r|1) = \frac{1}{\sigma\sqrt{2\pi}} \exp\left\{ -\frac{(r - \sqrt{2}\,A)^2}{2\sigma^2} \right\} \text{ and}$$

$$P(r|0) = \frac{1}{\sigma\sqrt{2\pi}} \exp\left\{ -\frac{(r + \sqrt{2}\,A)^2}{2\sigma^2} \right\}$$

Using Baye's rule and solving for $|r|$ gives:

$$|r| = \frac{\sigma^2(\log_e 3)}{2\sqrt{2}\,A}$$

This implies a threshold which must adapt to the mean levels of noise and signal. A simpler solution is to weight the signal before applying to a fixed threshold, i.e.:

$$\frac{A}{\sigma^2}|r| = \frac{\log_e 3}{2\sqrt{2}}$$

This requires normalizing the signal. The noise power out of the Rake combiner is proportional to the pilot energy, i.e.:

$$\sigma_r^2 = \sigma_c^2 P^2 k^2 \sum_{i=0}^{N-1} a_i^2$$

In the above equation, $\sigma_c$ is the unweighted noise voltage out of any of the correlators. The multiplier is exactly the sum of the squares of the pilot signals as applied to the scaling circuit in FIG. 4 of Great Britain patent application number 9313078.9. Thus, normalization of the r by $1/\sigma^2$, requires division by this scaling signal, as already performed in FIG. 4 of the above-mentioned patent application. In FIG. 4, the scaling is performed on a decision corrected signal to obtain a mean signal level. Thus, the output of the average and hold circuit in FIG. 1 is proportional to $$\frac{A}{\sigma^2}$$

and is the correct scale for r.

Figure 1:
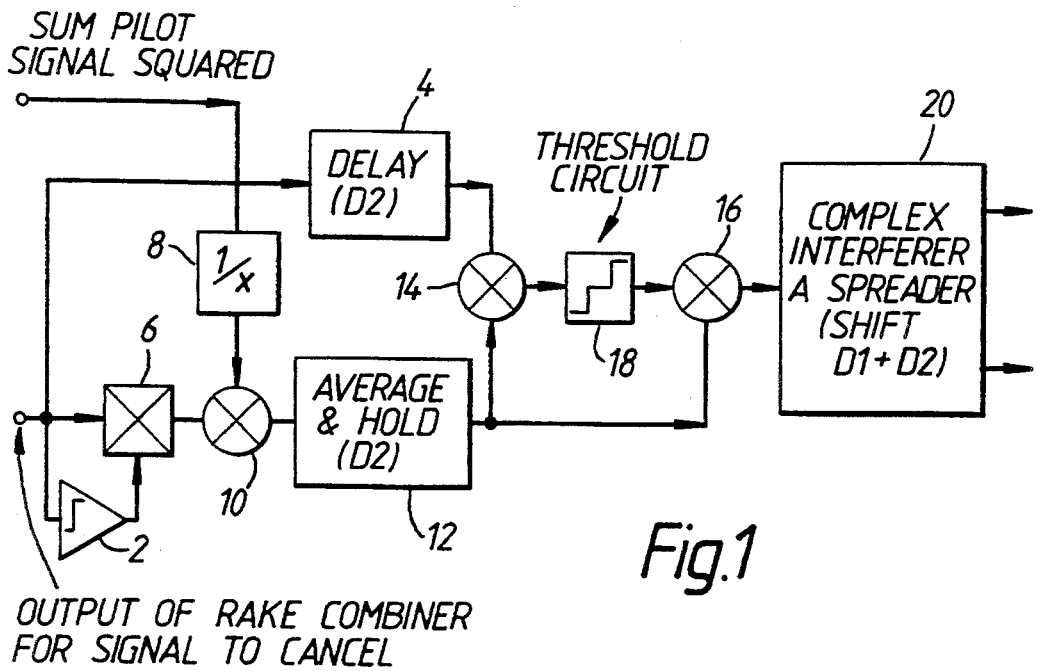
FIG. 1 is a block diagram of a cancellation means having optimum thresholding constructed in accordance with the principles of the present invention.

Referring to FIG. 1, a block diagram is shown for the thresholding cancellation means of the present invention. The threshold and cancellation means has a hard limiting device 2 which receives at an input an output signal form a Rake combiner which requires cancellation. The hard limiting device 2 performs decisions on the interferer's data which are used to reconstruct the interferer for the purpose of subtraction, i.e. cancellation. The output from the Rake combiner is also connected to an input of a delay circuit 4 and to an input of a combiner circuit 6. A scaling device 8 receives a summed and squared pilot signal from the Rake combiner. As mentioned above, the input shown in FIG. 1 is a sum pilot signal squared, such as that disclosed in FIG. 4 of Great Britain patent application 9313078.9. The scaling device 8 also has an output connected to an input of a multiplying circuit 10. An output from the combiner circuit 6 is connected to a further input of the multiplying circuit 10. An output from the multiplying circuit 10 is connected to an input of an average and hold device 12, the output of which is connected to an input of two further multiplying circuits 14 and 16. An output from the delay circuit 4 is connected to a further input of the multiplying circuit 14 and an output thereof is connected to an input of a threshold circuit 18. An output from the threshold circuit 18 is connected to a further input of the multiplying circuit 16, which has an output connected to an input of a complex interferer A spreader 20. The spreader 20 is provided with two output lines which are connected to further circuitry as shown in FIG. 4 of the above-mentioned patent application.

The threshold circuit 18 performs a bi-directional thresholding, since the requirement is to subtract a fixed voltage (weighted in the following circuit) which has the same sign as the instantaneous signal whenever the modulus of the instantaneous signal exceeds a threshold. In this manner, the cancellation means is turned on or off. Any constant terms required in the multiplications are assumed to be hardwired into the scaling used.

For a signal to noise ratio of 0 dB, an improvement in cancellation of about 0.85 dB can be achieved in the present invention. Further improvements can be obtained if the cancellation means is turned partially on or off according to the reliability of the decisions.

This can be achieved by weighting the canceling signal according to the reliability of the decisions, i.e. according to r. Thus, the weighting term is a function of r, k(r). For a given value of r:

$$C_{out,k} = A^2\{(m_k - d_k k(|r|))^2\}$$

Now if a correct decision is made, $m_k = d_k$ and $C_{out,k} = A^2(1-k(|r|))^2$. If an incorrect decision is made $m_k \neq d_k$ and $C_{out,k} = A^2(1+k(|r|))^2$. Therefore:

Differentiating with respect to $k(|r|)$ to obtain:

$$E\{C_{out}\} = A^2\{(1 - k(|r|))^2 \cdot (1 - P_e) + (1 + k(|r|))^2 \cdot P_e\}$$
$$= A^2\{1 - 2 \cdot k(|r|) \cdot (1 - 2P_e) + k^2(|r|)\}$$

$$\frac{dE\{C_{out}\}}{dk(|r|)} = A^2\{2k(|r|) - 2(1 - 2P_e)\}$$

Set to zero to find minimum:

$$k(|r|) = 1 - 2P_e = \frac{1 + \exp\left(\frac{2\sqrt{2}\,A|r|}{\sigma^2}\right) - 2}{1 + \exp\left(\frac{2\sqrt{2}\,A|r|}{\sigma^2}\right)} =$$

$$\frac{\exp\left(\frac{2\sqrt{2}\,A|r|}{\sigma^2}\right) - 1}{\exp\left(\frac{2\sqrt{2}\,A|r|}{\sigma^2}\right) + 1}$$

$$k(|r|) = \tanh\left(\frac{\sqrt{2}\,A|r|}{\sigma^2}\right)$$

The normalization against $$\frac{A}{\sigma^2}$$

is as for the thresholding circuit. The decision $d_k$ may be taken into the tanh non-linearity by removing the modulus operator. The circuit for applying the optimum non-linearity is shown in FIG. 2.

Figure 2:
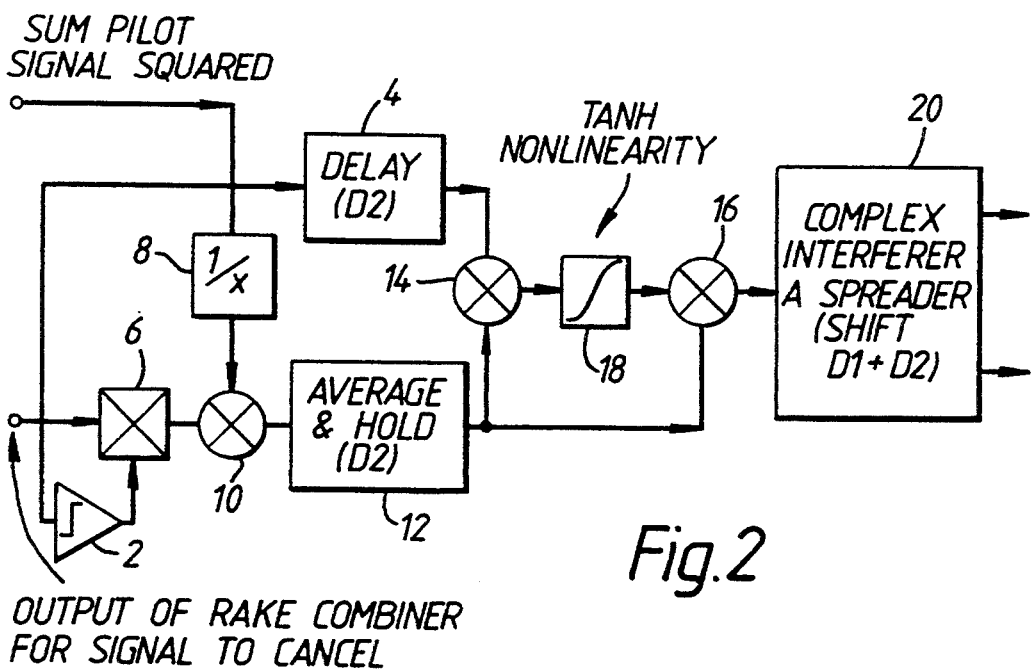
FIG. 2 is a block diagram of a cancellation means having optimum non-linearity constructed in accordance with the principles of the present invention.

The non-linearity obtained by FIG. 2 increases mean interference cancellation by about 1.35 dB at 0 dB signal to noise ratio.

With reference to FIG. 2, it would be seen that the circuit is substantially identical with that of FIG. 1 and therefore further description is deemed not to be necessary. However, the threshold circuit 18 is now arranged to perform a tanh non-linearity function which allows the cancellation means to be partially switched on and off.

Although the invention has been described with respect to preferred embodiments, it is not to be so limited as changes and modifications can be made therein which are within the full intended scope as defined by the appended claims.

I claim:

1. A cancellation apparatus, comprising:
   means for receiving and modifying an output signal indicative of an absolute value from a Rake combiner;

means for receiving and scaling a pilot signal;

first multiplying means for generating a signal, said signal being a product of the scaled pilot signal and the modified output signal from said receiving and modifying means;

an average and hold device for receiving said signal generated by said first multiplying means and providing an output signal;

second multiplying means for combining said output signal provided by said average and hold device and a delayed signal of said output signal from said Rake combiner, said second multiplying means providing an output signal;

generator means for receiving said output signal from said second multiplying means and generating a signal indicative of a non-linearity function;

third multiplying means for combining said output signal from said average and hold device and said signal indicative of a non-linearity function to produce an output signal; and interference spreading means for receiving said output signal from said third multiplying means, said output signal from said third multiplying means thereby controlling said interference spreading means.

2. A cancellation apparatus as claimed in claim 1, further comprising:

threshold means for performing said non-linearity function on an input signal, said threshold means providing an output signal equal to said input signal when the absolute value of said input signal exceeds a threshold and said output signal being zero for all other values of said input signal.

3. A cancellation apparatus as claimed in claim 1, wherein said non-linearity function is the mathematical function tanh, wherein if the input to said non-linearity function is x, the output will be tanh x, where tanh x is the hyperbolic tangent of x.

4. A method for controlling a cancellation apparatus, comprising the steps of:

receiving an output signal indicative of an absolute value from a Rake combiner and modifying said output signal;

receiving and scaling a pilot signal;

generating a signal using a first multiplying means, said signal being a product of said scaled pilot signal and said modified output signal;

receiving said signal generated by said first multiplying means using an average and hold device;

combining a signal generated from said average and hold device with a delayed signal of said output signal from said Rake combiner using a second multiplying means;

receiving an output signal from said second multiplying means and generating a signal indicative of a non-linearity function with a generator means, said signal being applied to a third multiplying means together with a signal from said average and hold device to produce an output signal; and providing interference spreading means for receiving said output signal from said third multiplying means, said interference spreading means being controlled by said output signal from said third multiplying means.

* * * * *